July 28, 1931. H. W. SMITH 1,816,405
POWER DRIVEN CONVEYER
Filed June 14, 1929
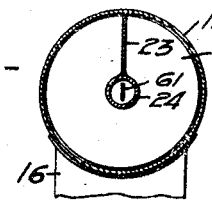
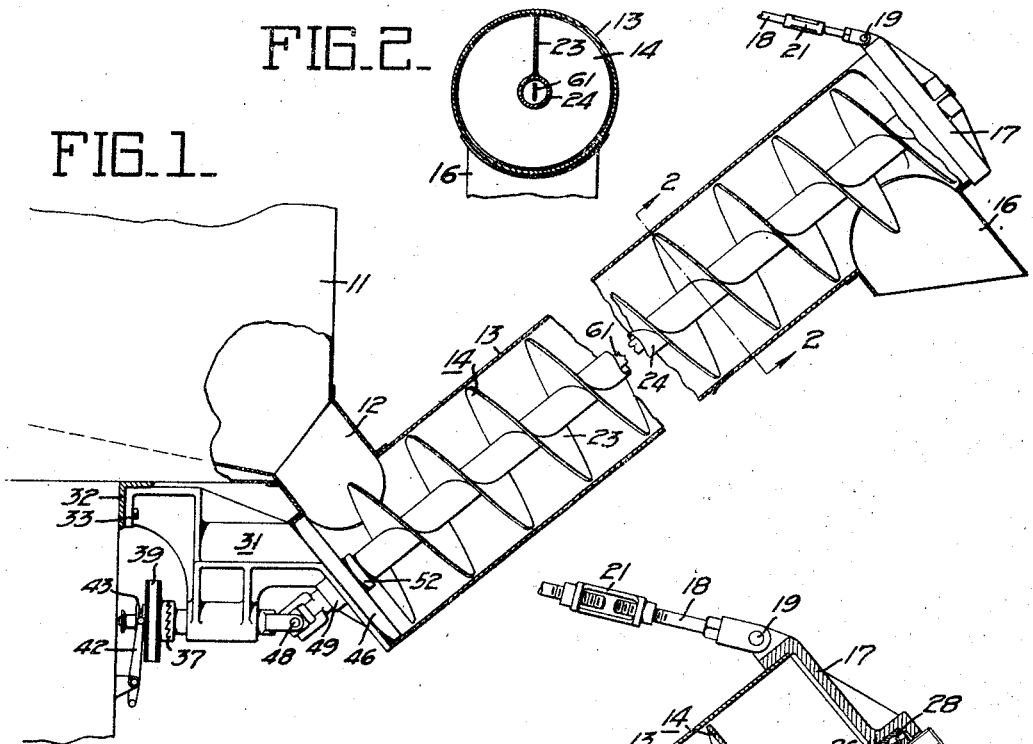
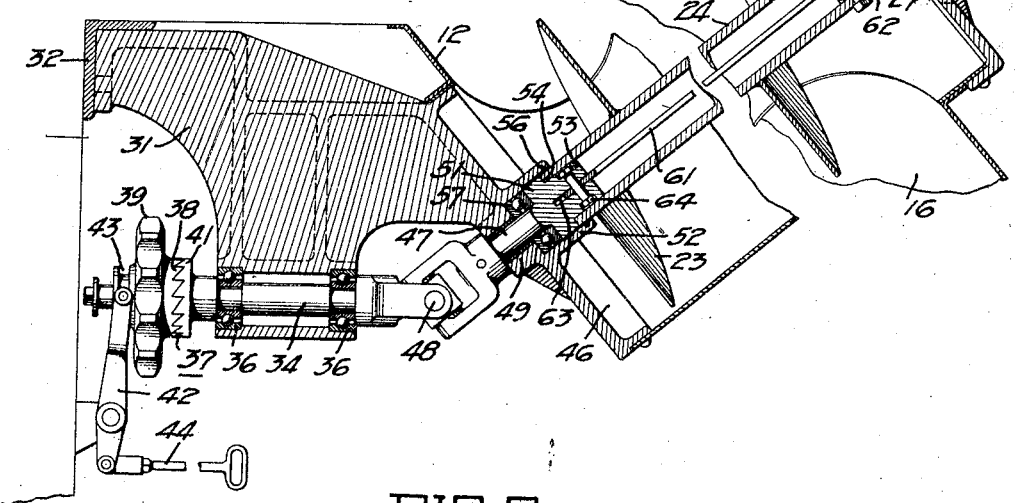
INVENTOR.
Horatio W. Smith
BY White, Prost & Fryer
ATTORNEYS.

Patented July 28, 1931

1,816,405

UNITED STATES PATENT OFFICE

HORATIO W. SMITH, OF STOCKTON, CALIFORNIA, ASSIGNOR TO CATERPILLAR TRACTOR CO., OF SAN LEANDRO, CALIFORNIA, A CORPORATION OF CALIFORNIA

POWER-DRIVEN CONVEYER

Application filed June 14, 1929. Serial No. 370,845.

My invention relates to drives for augers used for the conveyance of materials and particularly to those utilized in threshing machines for the handling of bulk grain.

It is an object of my invention to provide a simple auger drive which will permit an auger to be readily started and stopped under operating conditions.

Another object of my invention is to provide an auger drive which is protected from the materials which the auger is handling.

A further object of my invention is to provide a resilient auger drive of a simple form.

The invention possesses other advantageous features, some of which with the foregoing will be set forth at length in the following description where I shall outline in full that form of the auger drive of my invention, which I have selected for illustration in the drawings accompanying and forming part of the present specification. In said drawings I have shown one form of auger drive embodying my invention, but it is to be understood that I do not limit myself to such form since the invention, as set forth in the claim, may be embodied in a plurality of forms.

In the drawings:

Figure 1 is a side elevation, partly in cross section, of an auger drive constructed in accordance with my invention.

Fig. 2 is a cross section through the drive along the lines 2—2 of Fig. 1.

Fig. 3 is a cross section through a part of the drive illustrated in Fig. 1.

My invention may be briefly characterized as comprising the provision of means for positively driving an auger so that the auger may be readily stopped and started when loaded and which further protects the drive means against the material handled.

While my invention is particularly useful with auger drives employed in handling materials generally I have utilized it with marked success upon those drives provided upon harvesting machinery for handling bulk grain. Accordingly, while I do not wish to be limited to this disclosure, I shall preferably describe it as applied to a combined harvester.

As is particularly shown in Fig. 1, grain from a bulk grain bin 11 passes through a spout 12 into a usual form of casing 13 which encloses an auger 14. The auger, when rotated in a counterclockwise direction as seen in Fig. 2, is adapted to discharge grain through spout 16 into any conveyer or wagon positioned beneath it. A cap 17 is positioned on the end of the casing to close it. The whole is braced to the harvester by a rod 18 which is attached to the cap by swivel 19. The length of the rod is conveniently adjusted by a turnbuckle 21.

The auger 14 generally comprises a usual spiral 23 enclosed within the casing and preferably supported upon a hollow shaft 24 which usually extends the length of the auger. To position and to support the auger, shaft 24 is conveniently carried on a reduced portion 26 of a stub shaft 27. The stub shaft is usually journalled in the cap in a roller bearing 28. The auger shaft is conveniently secured to the stub shaft by thru bolt 29.

To provide a support for the inboard side of the auger, and for other reasons, frame member 31 is provided and is secured to frame 32 of the harvester by bolts 33. The frame 31 also serves as a support for drive shaft 34 rotatably mounted in roller bearings 36.

Since, under normal operating conditions it is usual for the auger to be started and stopped with the space between the auger and the casing practically filled with grain, a high initial load is placed upon the driving mechanism when the auger is started. This service is particularly severe and difficulties have been encountered in providing an inexpensive and rugged clutch to transmit the required power in a satisfactory manner. Satisfactory clutch mechanisms are usually expensive and, furthermore, under the conditions in which harvesting machinery is employed, are difficult of maintenance. In accordance with my invention I preferably provide a relatively simple positive and inexpensive clutch. Thus I prefer to employ a jaw clutch 37. To accomplish the transmission of power in a facile manner, I prefer to form a jaw 38 of the clutch integrally with a slidable sprocket 39. The sprocket is readily connected to a power source on the harvester. The other jaw 41 is usually fixed to the shaft and accordingly transmits power received from the integral jaw and sprocket of the shaft 34. The engagement of the jaws of the clutch is effected by sliding the sprocket on the shaft. This is usually effected by a pivotally mounted bifurcated lever arm 42 which is adapted to engage a collar 43 on the sprocket. An actuating handle 44 serves to move the arm 42 from some distant or convenient point.

To transmit power from the drive shaft 34 to the auger I preferably position in an extending portion 46 of the frame 31 driving shaft 47 angularly positioned with respect to shaft 34. This driving shaft is conveniently connected to the drive shaft 34 by a suitable universal joint 48 and is usually journalled in bearing 49. Usually I provide the driving shaft with an extension 51 which is received in a boss 52 formed upon the frame. The hollow auger shaft is conveniently received by a reduced portion 53 of the extension and usually abuts a shoulder 54 formed by the reduced portion with the extension. It is to be noted that the hollow auger shaft is free to rotate on the reduced portion of the shaft and that a relative rotation is thus possible between the auger shaft and the drive shaft. A packing strip 56 is positioned adjacent to the end of the boss to seal the several rotating parts within it from the undesirable entrance of dust or other foreign matter and to retain lubricant supplied to the rotating parts therein. To carry the end thrust of the auger a thrust bearing 57 is usually positioned between the extension 51 and the frame.

I have found that the operation of the device of my invention is materially improved if a portion of the drive connected to the auger be resilient. While the resiliency can be provided in a number of ways I prefer to position within the hollow auger shaft a strip 61 of resilient material such as steel. This strip is usually received in grooves 62 and 63 provided respectively in portion 26 of stub shaft 27 and in extension 51 of the driving shaft. The strip is secured to the stub shaft and the auger shaft by thru bolt 29, and to the driving shaft by a bolt 64. It is to be noted that the torsional forces in the strip, which arise in operation, are transmitted directly to the members surrounding the grooves in which the strip is positioned. The undue stressing of the bolts is thus obviated as is the tendency to shear them off.

When the power is thrown on thru the positive engagement of the jaw clutch it is to be noted that the resilient strip dampens the sudden force supplied. This procures a relatively smooth application of power to the usually loaded auger and allows the high initial inertia present in it to be overcome in a manner which does not place undue stress upon any of the simple mechanisms involved.

I claim:

In a threshing machine, a support, a drive shaft rotatably mounted in said support, a housing secured to said support, an auger enclosed in said housing, having a hollow shaft rotatably mounted at the outer end in said housing and at the inner end on said drive shaft, and a resilient driving connection from said drive shaft through said hollow shaft to the outer end thereof.

In testimony whereof, I have hereunto set my hand.

HORATIO W. SMITH.